United States Patent
Jung

(10) Patent No.: US 11,641,543 B2
(45) Date of Patent: May 2, 2023

(54) SOUND SOURCE LOCALIZATION FOR ROBOT

(71) Applicant: LG ELECTRONICS INC., Seoul (KR)

(72) Inventor: Kilsu Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 28 days.

(21) Appl. No.: 17/099,682

(22) Filed: Nov. 16, 2020

(65) Prior Publication Data

US 2021/0168547 A1 Jun. 3, 2021

(30) Foreign Application Priority Data

Dec. 3, 2019 (KR) .................. 10-2019-0159323

(51) Int. Cl.
*H04S 7/00* (2006.01)
*G06V 20/00* (2022.01)

(52) U.S. Cl.
CPC .............. *H04S 7/302* (2013.01); *G06V 20/00* (2022.01)

(58) Field of Classification Search
None
See application file for complete search history.

(56) References Cited

U.S. PATENT DOCUMENTS

2006/0002566 A1* 1/2006 Choi ................ H04S 1/002
 381/58
2021/0232150 A1* 7/2021 Torii ................ G10L 15/22

* cited by examiner

*Primary Examiner* — James K Mooney
(74) *Attorney, Agent, or Firm* — Lee, Hong, Degerman, Kang & Waimey PC

(57) ABSTRACT

Disclosed are a robot which localizes a sound source based on sound spot information of at least one sound spot, and a sound source localization method. The robot can communicate with other electronic devices and a server in a 5G communication environment.

11 Claims, 6 Drawing Sheets

SOUND SOURCE LOCALIZATION FOR ROBOT

CROSS-REFERENCE TO RELATED APPLICATION

Pursuant to 35 U.S.C. § 119(a), this application claims the benefit of earlier filing date and right of priority to Korean Patent Application No. 10-2019-0159323, filed on Dec. 3, 2019, the contents of which are all hereby incorporated by reference herein in their entirety.

BACKGROUND

1. Technical Field

The present disclosure relates to a sound source localization method for a robot, and a robot which localizes a sound source according to the sound source localization method.

2. Description of Related Art

Recently, robots which can be conveniently used in daily life are being actively developed. Such robots interact with people to provide assistance in their daily lives, at homes, schools, and public places. Speech recognition technology is being widely utilized as an interface method for interaction between robots and humans.

In recent years, various methods are being developed and utilized for tracking and localizing sound sources. Examples of methods for tracking and localizing sound sources include a method of locating sound sources by measuring signal intensities and taking path loss due to distance into account, a method of locating sound sources by using an angle of arrival (AOA) toward two or more sound source receivers, a method using a space spectrum, and a method of localizing sound sources by using a sound source transferring time.

There is consequently a need for a technology which enables effective tracking and localizing of sound sources in an environment where multiple sounds are emitted simultaneously.

SUMMARY OF THE INVENTION

One aspect of the present disclosure is to provide a robot capable of localizing sound sources in an environment in which multiple sounds are emitted simultaneously.

Another aspect of the present disclosure is to provide a time-efficient sound source localization method for sounds emitted in everyday life.

Another aspect of the present disclosure is to provide a robot capable of providing precise reactions to input sounds.

The present disclosure is not limited to what has been described above, and other aspects not mentioned herein will be apparent from the following description to one of ordinary skill in the art to which the present disclosure pertains.

One embodiment of the present disclosure provides a robot which stores locations from which sounds can potentially be emitted and locations where sounds have been generated before, and utilizes the stored locations in searching for sound sources.

To this end, the robot comprises a memory configured to store sound spot information associated with at least one sound spot, and a processor configured to determine a search area to search for a sound source that has emitted an input sound based on the sound spot information that corresponds to a potential spatial location capable of emitting the input sound, search for the at least one sound spot located in the determined search area according to a search sequence that is determined based at least in part on the stored sound spot information, and determine a target sound spot among the at least one sound spot based at least in part on a search result of the searching, where the target sound spot corresponds to a location of the sound source.

Another embodiment of the present disclosure provides a sound source localization method which localizes a sound source based on a sound emission history and a sound emission possibility.

To this end, the sound source localization method may comprise determining a search area to search for a sound source that has emitted an input sound based on sound spot information that corresponds to a potential spatial location capable of emitting the input sound, wherein the sound spot information is associated with at least one sound spot, searching for at least one sound spot located in the determined search area according to a search sequence that is determined based at least in part on the sound spot information, and determining a target sound spot among the at least one sound spot based at least in part on a search result of the searching, where in the target sound spot corresponds to a location of the sound source.

Still another embodiment of the present disclosure provides a robot capable of performing an action in response to an input sound.

More specifically, the robot can determine an action in response to the input sound based on the location of a sound source in a target sound spot.

Aspects of the present disclosure are not limited what has been disclosed hereinabove, and other aspects can be clearly understood from the following description by those skilled in the art to which the present disclosure pertains.

According to embodiments of the present disclosure, effective localization of sound sources is possible in an environment where multiple sounds are emitted simultaneously.

According to embodiments of the present disclosure, time-efficient localization of sound sources is possible.

According to embodiments of the present disclosure, a robot can make precise reactions in response to input sounds, and thus, the level of satisfaction regarding interactions can be increased.

It should be noted that effects of the present disclosure are not limited to the effects of the present disclosure as mentioned above, and other unmentioned effects of the present disclosure will be clearly understood by those skilled in the art from an embodiment described below.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
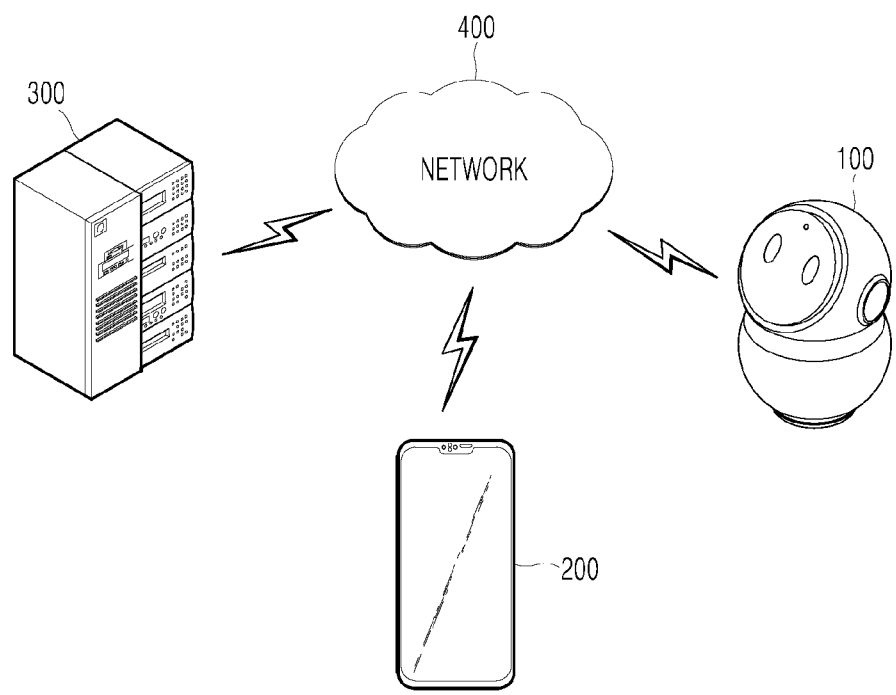
FIG. 1 is a schematic diagram of an operating environment for a robot according to an embodiment of the present disclosure.

Hereinafter, embodiments disclosed herein will be described in detail with reference to the accompanying drawings, and the same reference numerals are given to the same or similar components and duplicate descriptions thereof will be omitted. In addition, in describing an embodiment disclosed in the present document, if it is determined that a detailed description of a related art incorporated herein unnecessarily obscure the gist of the embodiment, the detailed description thereof will be omitted.

The terminology used herein is used for the purpose of describing particular exemplary embodiments only and is not intended to be limiting. It must be noted that as used herein and in the appended claims, the singular forms "a," "an," and "the" include the plural references unless the context clearly dictates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or a combination thereof. Furthermore, these terms such as "first," "second," and other numerical terms, are used only to distinguish one element from another element. These terms are generally only used to distinguish one element from another.

FIG. 1 is a diagram of an example of an operating environment for a robot according to an embodiment.

The robot's operating environment may include a robot 100, a terminal 200, a server 300, and a network 400 connecting the aforementioned components to one another. Various electronic devices other than the devices shown in FIG. 1 may be interconnected through the network 400 and operated.

The robot 100 detects an input sound and provides a reaction to the detected input sound. Here, the reaction includes locating the sound source that has emitted the input sound, and setting the field of view of the robot 100 toward the location of the located sound source.

The sound source refers to an object that emits sounds. For example, the sound source may include various electronic appliances, such as a TV, a cleaning apparatus, a washing machine, and an air conditioner, and objects that are expected to emit sounds, such as various musical instruments. For example, the sound source may include objects capable of emitting various everyday noises, such as a chair, a table, a sink, a door, a window, and a curtain. For example, the sound source may include a user who utters voice commands, a home robot, and a pet.

In order to locate a sound source that has emitted an input sound, the robot 100 may first search sound spots. The sound spots include places and objects that have previously emitted a sound or are expected to emit a sound, within a space where the robot 100 is located.

The robot 100 may locate the sound source that has emitted the input sound based on sound spot information about sound spots located within the space.

The sound spot information refers to information about sound spots. The sound spot information will be described in detail below with reference to FIG. 4.

The robot 100 may locate the sound spot that has emitted the input sound based on the sound spot information and determine a reaction in response to the input sound. In addition, the robot 100 may operate according to the reaction determined in response to the input sound. In addition, the robot 100 may transmit, to the terminal 200, the result of the operation according to the determined reaction.

For example, the robot 100 may, based on the sound spot information, locate a user who has uttered an activation word and look at the user's face as a reaction to the activation word.

For example, the robot 100 may, based on the sound spot information, locate the object that has caused a noise, and as a reaction to the noise, survey the object that has caused the noise and its surroundings and transmit, to the terminal 200, a notification according to the survey result.

The server 300 may store and manage the sound spot information. The server 300 may update the sound spot information and transmit the updated sound spot information to the robot 100.

The server 300 may receive an input sound detected by the robot 100, and based on the sound spot information stored on the server 300, locate the sound source that has emitted the input sound and transmit the location of the sound source to the robot 100.

The robot 100 may refer to a machine which automatically handles a given task by its own ability, or which operates autonomously. In particular, a robot having a function of recognizing an environment and performing an operation according to its own judgment may be referred to as an intelligent robot.

The robot 100 may be classified into industrial, medical, household, and military robots, according to the purpose or field of use.

The robot 100 may include an actuator or a driving unit including a motor in order to perform various physical operations, such as moving joints of the robot. Moreover, a movable robot may include, for example, a wheel, a brake, and a propeller in the driving unit thereof, and through the driving unit may thus be capable of traveling on the ground or flying in the air.

By employing AI technology, the robot 100 may be implemented as a guide robot, a transport robot, a cleaning robot, a wearable robot, an entertainment robot, a pet robot, an unmanned flying robot, or a home robot.

The robot 100 may include a robot control module for controlling its motion. The robot control module may correspond to a software module or a chip that implements the software module in the form of a hardware device.

Using sensor information obtained from various types of sensors, the robot 100 may obtain state information of the robot 100, detect (recognize) the surrounding environment and objects, generate map data, determine a movement route and drive plan, determine a response to a user interaction, or determine an operation.

Here, in order to determine the movement route and drive plan, the robot 100 may use sensor information obtained from at least one sensor among a lidar, a radar, and a camera.

The robot 100 may perform the operations above by using a trained model configured by at least one artificial neural network. For example, the robot 100 may recognize the surrounding environment and objects by using the trained model, and determine its operation by using the recognized surrounding environment information or object information. Here, the trained model may be trained by the robot 100 itself or trained by an external device such as the server 300.

At this time, the robot 100 may perform the operation by generating a result by employing the trained model directly, but may also perform the operation by transmitting sensor information to an external device such as the server 300 and receiving a result generated accordingly.

The robot 100 may determine the movement route and drive plan by using at least one of object information detected from the map data and sensor information or object information obtained from an external device, and drive according to the determined movement route and drive plan by controlling the driving unit.

The map data may include object identification information about various objects disposed in the space in which the robot 100 drives. For example, the map data may include object identification information about static objects such as wall and doors and movable objects such as a flowerpot and a desk. In addition, the object identification information may include, for example, a name, type, distance, and location of an object.

Also, the robot 100 may perform an operation or drive by controlling its driving unit based on the control/interaction of the user. At this time, the robot 100 may obtain intention information of the interaction according to the user's motion or spoken utterance, and perform an operation by determining a response based on the obtained intention information.

Artificial intelligence refers to a field of studying artificial intelligence or a methodology for creating the same. Moreover, machine learning refers to a field of defining various problems dealing in an artificial intelligence field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. An ANN may be defined by a connection pattern between neurons on different layers, a learning process for updating model parameters, and an activation function for generating an output value.

An ANN may include an input layer, an output layer, and optionally one or more hidden layers. Each layer includes one or more neurons, and the ANN may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, hyperparameters refer to parameters which are set before learning in a machine learning algorithm, and include a learning rate, a number of iterations, a mini-batch size, an initialization function, and the like.

The objective of training an ANN is to determine a model parameter for significantly reducing a loss function. The loss function may be used as an indicator for determining an optimal model parameter in a learning process of an artificial neural network.

Machine learning may be classified into supervised learning, unsupervised learning, and reinforcement learning depending on the learning method.

Supervised learning may refer to a method for training the artificial neural network with training data that has been given a label. In addition, the label may refer to a target answer (or a result value) to be inferred by the artificial neural network when the training data is inputted to the artificial neural network. Unsupervised learning may refer to a method for training an artificial neural network using training data that has not been given a label. Reinforcement learning may refer to a learning method for training an agent defined within an environment to select an action or an action order for maximizing cumulative rewards in each state.

Machine learning of an ANN implemented as a deep neural network (DNN) including a plurality of hidden layers may be referred to as deep learning, and the deep learning is one machine learning technique. Hereinafter, the meaning of machine learning includes deep learning.

The terminal 200 is an electronic device operated by a user or an operator, and the user may drive an application for controlling the robot 100, or may access an application installed in an external device, including the server 300, using the terminal 200.

The terminal 200 may receive state information of the robot 100 from the robot 100 and/or the server 300 through the network 400.

The terminal 200 may provide the user with the function of monitoring the robot 100 through an application installed thereon.

The terminal 200 may include a communication terminal capable of carrying out the function of a computing device (not illustrated). Here, the terminal 200 may be, but is not limited to, a desktop computer, a smartphone, a laptop computer, a tablet PC, a smart TV, a cellular phone, a personal digital assistant (PDA), a media player, a micro-server, a global positioning system (GPS) device, an electronic book terminal, a digital broadcasting terminal, a navigation device, a kiosk, an MP3 player, a digital camera, an electric home appliance, or any of other mobile or immobile computing devices configured to be manipulated by a user. In addition, the terminal 200 may be a wearable device such as a watch, glasses, a hair band, or a ring, provided with a communication function and a data processing function. The terminal 200 is not limited to the above, and any terminal capable of performing web browsing may be used without limitation.

The server 300 may be a database server which stores and provides sound spot information. The server 300 may be an application server which receives an input sound from the robot 100, determines the location of the sound source that has emitted the received input sound based on the sound spot information stored on the server 300, and provides the location of the sound source to the robot 100.

The server 300 may include a web server or an application server that enables monitoring of the robot 100 by using an application or a web-browser installed on the terminal 200. The server 300 may be a database server that provides big data necessary for applying various artificial intelligence algorithms and data relating to a robot control.

The network 400 may serve to connect the robot 100, the terminal 200, and the server 300 to each other. The network 400 may include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the present disclosure is not limited to these examples. Furthermore, the network 400 may transmit/receive information using short-range communications and/or long-distance communications. Short-range communication may include Bluetooth®, radio frequency identification (RFID), infrared data association (IrDA), ultra-wideband (UWB), ZigBee, and Wi-Fi (wireless fidelity) technologies, and the long distance communication may include code division multiple access (CDMA), frequency division multiple access (FDMA), time division multiple access (TDMA), orthogonal frequency division multiple access (OFDMA), and single carrier frequency division multiple access (SC-FDMA).

The network 400 may include connection of network elements such as hubs, bridges, routers, switches, and gateways. The network 400 may include one or more connected networks, including a public network such as Internet and a private network such as a secure corporate private network, for example, a multiple network environment. Access to the network 400 can be provided via one or more wired or wireless access networks. Furthermore, the network 400 may support the Internet of things (IoT) for 5G communication or exchanging and processing information between distributed elements such as objects.

Figure 2:
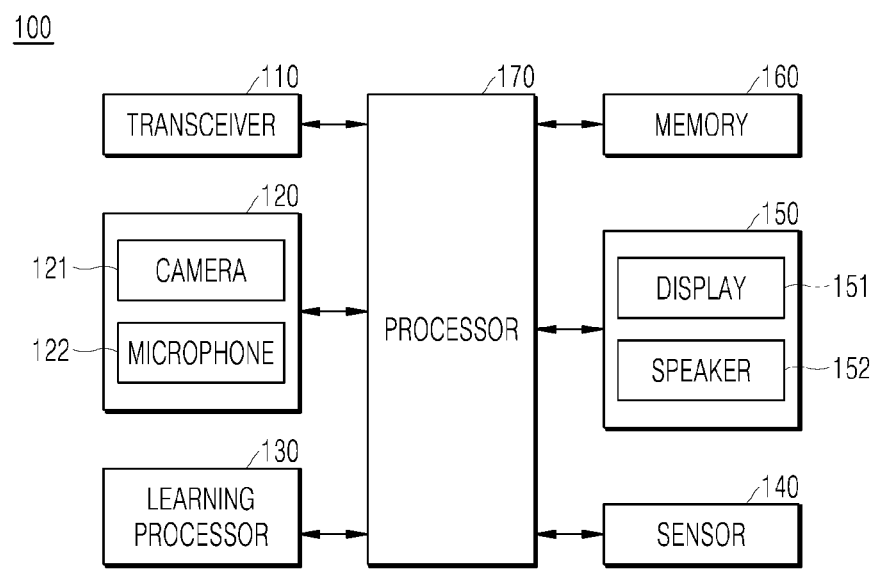
FIG. 2 is a block diagram of a robot according to an embodiment of the present disclosure.

FIG. 2 is a block diagram of a robot according to an embodiment of the present disclosure.

The robot 100 may include a transceiver 110, an input interface 120, a learning processor 130, a sensor 140, an output interface 150, a memory 160, a processor 170, and the like. The elements shown in FIG. 2 are not essential in realizing the robot 100, and the robot 100 may include a larger or smaller number of elements than the above elements.

The transceiver 110 may transmit/receive data with external devices such as other AI devices or the server 300 by using wired or wireless communication technology. For example, the transceiver 110 may transmit or receive sensor data, user input, a trained model, a control signal, and the like with the external devices. The AI device may also, for example, be realized by a stationary or a mobile device, such as a TV, a projector, a mobile phone, a smartphone, a laptop computer, a digital broadcasting terminal, a personal digital assistant (PDA), a portable multimedia player (PMP), a navigation device, a tablet PC, a wearable device, a set top box (STB), a DMB receiver, a radio, a washer, a refrigerator, digital signage, a robot, or a vehicle.

The communication technology used by the transceiver 110 may be technology such as global system for mobile communication (GSM), code division multi access (CDMA), long term evolution (LTE), 5G, wireless LAN (WLAN), Wireless-Fidelity (Wi-Fi), Bluetooth™, radio frequency identification (RFID), infrared data association (IrDA), ZigBee, and near field communication (NFC). The transceiver 110 may include a transmitter, a receiver, a transceiver, a modem, a port, a controller, an antenna, and other components to perform data transmission and reception functions for various types of communications.

The transceiver 110 may receive input sound data detected by an external electronic device under the control of the processor 170. For example, the external electronic device may be an electronic device including a microphone, which detects a sound emitted in a space and transmits data about the detected sound to the robot 100. Here, the external electronic device may be an artificial intelligence speaker, a desktop computer, a smartphone, a notebook computer, a tablet PC, a smart TV, a mobile phone, a personal digital assistant (PDA), a laptop, a media player, a micro server, a global positioning system (GPS) device, an electronic book terminal, a digital broadcast terminal, a navigation device, a kiosk, an MP3 player, a digital camera, a home appliance, and other mobile or immobile computing devices, but is not limited thereto. The external electronic device may be a wearable device, such as a watch, glasses, a hair band, and a ring, that has a communication function and a data processing function, but is not limited thereto.

Under control of the processor 170, the transceiver 110 may communicate with the server 300. Under control of the processor 170, the transceiver 110 may transmit data about an input sound to the server 300. Under control of the processor 170, the transceiver 110 may receive from the server 300 the location information of the sound source that has emitted the input sound.

Under control of the processor 170, the transceiver 110 may communicate with the terminal 200. Under control of the processor 170, the transceiver 110 may transmit, to the terminal 200, the result of a reaction in response to the input sound. Upon receiving the result of the reaction in response to the input sound, the terminal 200 may output the result of the reaction in response to the input sound to a user.

The input interface 120 may obtain various types of data.

Here, the input interface 120 may include a camera 121 for inputting image signals, a microphone 122 for receiving audio signals, a keyboard/keypad (not illustrated) for receiving information inputted from a user, and other components. Here, the camera 121 or the microphone 122 may be regarded as a sensor, and therefore a signal acquired from the camera 121 or the microphone 122 may be sensing data or sensor information.

The robot 100 may detect sounds emitted in its surroundings by using the microphone 122. The robot may detect an input sound by using the microphone 122. For example, under control of the processor 170, the robot 100 may obtain the input sound by preprocessing environmental sounds detected by the microphone 122 through a noise removing filter.

Under control of the processor 170, the robot 100 may obtain surrounding images through the camera 121. Under control of the processor 170, the robot 100 may obtain an image of a specific area in a space through the camera 121. For example, under control of the processor 170, the robot 100 may obtain an image of a search area determined to correspond to the input sound through the camera 121. For example, under control of the processor 170 the robot 100 may obtain an image of a sound spot determined to correspond to the input sound through the camera 121. The processor 170 may extract an input feature from the image obtained through the camera 121.

The input interface 120 may obtain, for example, training data for model training and input data used when an output is obtained using a trained model. The input interface 120 may obtain raw input data. In this case, the processor 170 or the learning processor 130 may extract an input feature by preprocessing the input data.

The learning processor 130 may train a model, composed of an artificial neural network, using training data. Here, the trained artificial neural network may be referred to as a trained model. The trained model may be used to infer a result value with respect to new input data rather than training data, and the inferred value may be used as a basis for a determination to perform an operation. For example, the trained model may be installed on the server 200 or the robot 100 and used in recognizing objects. For example, the trained model may include an object recognition model for recognizing objects from an input image.

At this time, the learning processor 130 may perform AI processing together with a learning processor 320 of the server 300.

The learning processor 130 may include a memory integrated or implemented in the robot 100. Alternatively, the learning processor 130 may also be implemented by using the memory 160, an external memory directly coupled to the robot 100, or a memory held in an external device.

The sensor 140 may acquire at least one of internal information of the robot 100, surrounding environment information of the robot 100, or user information by using various sensors. The sensor 140 may include one or more sensors.

The sensor 140 may include an image sensor, a proximity sensor, an illumination sensor, an acceleration sensor, a magnetic sensor, a gyroscope sensor, an inertial sensor, an RGB sensor, an infrared (IR) sensor, a finger scan sensor, an ultrasonic sensor, an optical sensor, a microphone, a light detection and ranging (lidar) sensor, radar, or a combination thereof.

The sensor 140 may acquire various kinds of data, such as training data for model training and input data used when an output is acquired using a trained model. The sensor 140 may obtain raw input data. In this case, the processor 170 or the learning processor 130 may extract an input feature by preprocessing the input data.

The output interface 150 may generate a visual, auditory, or tactile related output.

Here, the output interface 150 may include a display 151 for outputting visual information, a speaker 152 for outputting auditory information, a haptic module (not illustrated) for outputting tactile information, and the like.

The display 151 may output a message as a reaction to the input sound under control of the processor 170. The speaker 152 may output a voice message or an alarm sound as a reaction to the input sound under control of the processor 170.

The memory 160 may store data supporting various functions of the robot 100. For example, the memory 160 may store input data obtained by the input interface 120, sensor information obtained by the sensor 140, training data, a trained model, a learning history, and the like.

The memory 160 may store sound spot information associated with at least one sound spot that correspond to potential spatial locations capable of emitting the input sound. Under control of the processor 170, the sound spot information may be used in determining the location of the sound source that has emitted the input sound. The sound spot information stored in the memory 160 may be generated and updated under control of the processor 170.

The memory 160 may store an object recognition model. The object recognition model stored in the memory 160 may be used in recognizing sound spots from an image, under control of the processor 170. The processor 170 may receive, through the transceiver 110, the object recognition model from the server 300, and store the object recognition model in the memory 160. The processor 170 may receive update information about the object recognition model through the transceiver 110 from the server 300, and may have the received update information reflected in the object recognition model stored in the memory 160.

The memory 160 may store a trained model. Under control of the processor 170, the trained model stored in the memory 160 may be used to determine a target sound spot among at least one sound spot, and to locate a sound source in the target sound spot. The processor 170 may receive the trained model through the transceiver 110 from the server 300 and store the received trained model in the memory 160. The processor 170 may receive update information about the learning trained from the server 300 through the transceiver 110 and may have the received updated information reflected in the trained model stored in the memory 160.

In addition, the memory 160 may store map data of a space in which the robot 100 is located.

The memory 160 may include, but is not limited to, magnetic storage media or flash storage media. This memory 160 may include an internal memory and/or an external memory and may include a volatile memory such as a DRAM, a SRAM or a SDRAM, and a non-volatile memory such as one time programmable ROM (OTPROM), a PROM, an EPROM, an EEPROM, a mask ROM, a flash ROM, a NAND flash memory or a NOR flash memory, a flash drive such as an SSD, a compact flash (CF) card, an SD card, a Micro-SD card, a Mini-SD card, an XD card or memory stick, or a storage device such as a HDD.

The processor 170 is a type of a central processor unit which may drive control software provided in the memory 160 to control the operation of the robot 100. The processor 170 may include all kinds of devices capable of processing data. Here, the processor 170 may, for example, refer to a data processing device embedded in hardware, which has a physically structured circuitry to perform a function represented by codes or instructions contained in a program. Examples of the data processing device embedded in hardware include processing devices such as a microprocessor, a central processing unit (CPU), a processor core, a multiprocessor, an application-specific integrated circuit (ASIC), a field programmable gate array (FPGA), and the like, but the scope of the present disclosure is not limited thereto. The processor 170 may include one or more processors.

The processor 170 may determine at least one executable operation of the robot 100, based on information determined or generated using a data analysis algorithm or a machine learning algorithm. In addition, the processor 170 may control components of the robot 100 to perform the determined operation.

To this end, the processor 170 may request, retrieve, receive, or use data of the learning processor 130 or the memory 160, and may control components of the robot 100 to execute a predicted operation or an operation determined to be preferable of the at least one executable operation.

At this time, if the connection of the external device is required to perform the determined operation, the processor 170 may generate a control signal for controlling the corresponding external device, and transmit the generated control signal to the corresponding external device.

The processor 170 may obtain intent information regarding a user input, and may determine a requirement of a user based on the obtained intent information.

Here, the processor 170 may obtain the intent information corresponding to a user input by using at least one of a speech to text (STT) engine for converting a speech input into a character string or a natural language processing (NLP) engine for obtaining intent information of natural language.

Here, at least one of the STT engine or the NLP engine may be composed of artificial neural networks, some of which are trained according to a machine learning algorithm. In addition, at least one of the STT engine or the NLP engine may be trained by the learning processor 130, trained by a learning processor 320 of the server 300, or trained by distributed processing thereof.

The processor 170 may collect history information including, for example, operation contents and user feedback on an operation of the robot 100, and store the history information in the memory 160 or the learning processor 130, or may transmit the history information to an external device such as the server 300. The collected history information may be used to update the trained model.

The processor 170 may control at least some of components of the robot 100 to drive an application program stored in the memory 160. Furthermore, the processor 170 may operate two or more components included in the robot 100 in combination with each other to drive the application program.

The processor 170 is connected to the memory 160. Here, being connected refers to there being a physical and logical path that enables transmission and reception of control signals and data.

The processor 170 may be configured to determine, based on the sound spot information stored in the memory 160, a search area in which to search for a sound source that has emitted the input sound, and search at least one sound spot located in the search area according to a search sequence determined based on the sound spot information, and determine, among the at least one sound spot, a target sound spot where the sound source is located. Here, the processor 170 being configured to perform a task means that the processor 170 is configured to perform the corresponding task by executing a series of instructions stored in the memory 160.

To determine the search area, the processor 170 may be further configured to determine the search area based on distribution information of sound spots.

The processor 170 may be further configured to determine the search area based on the distribution information of sound spots having sound spot attributes that match attributes of the input sound.

The processor 170 may be further configured to determine the at least one sound spot located in the search area based on location information of sound spots.

The processor 170 may be further configured to determine the search sequence with respect to the at least one sound spot based on the sound spot score of the at least one sound spot.

The processor 170 may be further configured to first search, among the at least one sound spot, the search spot having sound spot attributes that match the attributes of the input sound.

The processor 170 may be further configured to obtain an image of the search area, and extract, from the search area, at least one image area corresponding to each of the at least one sound spot, and determine, among the at least one image area, the target sound spot where the sound source is located.

The processor 170 may be further configured to locate the sound source within the at least one image area based on identification information of the at least one sound spots. The processor 170 may be further configured to locate the sound source within the at least one image area based on the attributes of the input sound.

The processor 170 may be further configured to determine an action in response to the input sound based on the location of the sound source in the target sound spot.

The processor 170 may be further configured to search, among at least one candidate sound spot, a candidate sound spot located in the search area.

The processor 170 may be further configured to obtain an image of a space, and by using the object recognition model stored in the memory 160, recognize the at least one candidate sound spot from the image of the space, and generate sound spot information of the at least one candidate sound spot.

The processor 170 may be further configured to update the sound spot score of the determined target sound spot.

Figure 3:
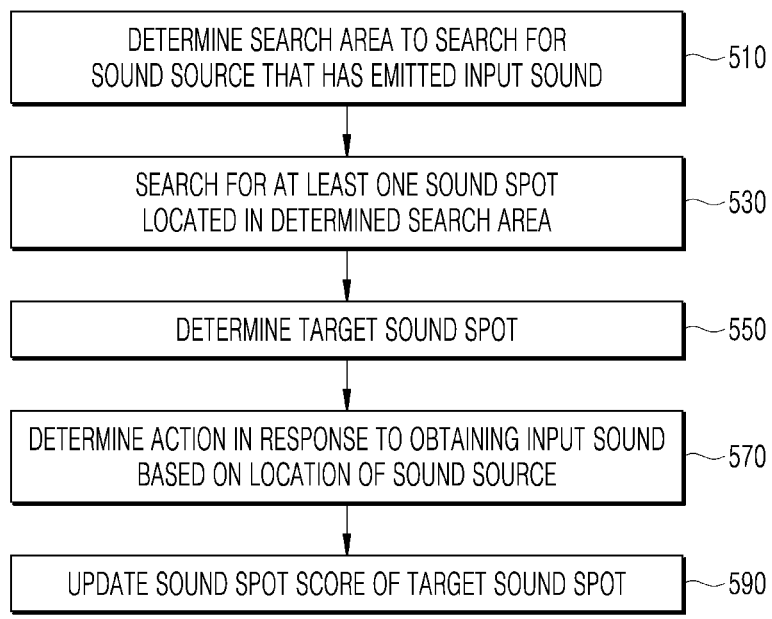
FIG. 3 is a flowchart of a sound source localization method according to an embodiment of the present disclosure.

FIG. 3 is a flowchart for a sound source localization method according to an embodiment of the present disclosure.

The sound source localization method may include determining a search area to search for a sound source that has emitted an input sound based on sound spot information associated with at least one sound spot corresponding to potential spatial locations capable of emitting the input sound (step 510), searching for at least one sound spot located in the determined search area according to a search sequence determined based at least part on the sound spot information (step 530), and determining the target sound spot among the at least one sound spot based at least in part on a result of the searching, wherein the target sound spot corresponds to a location of the sound source (step 550).

Hereinbelow, the sound spot information will be described in detail with reference to FIG. 4.

Figure 4:
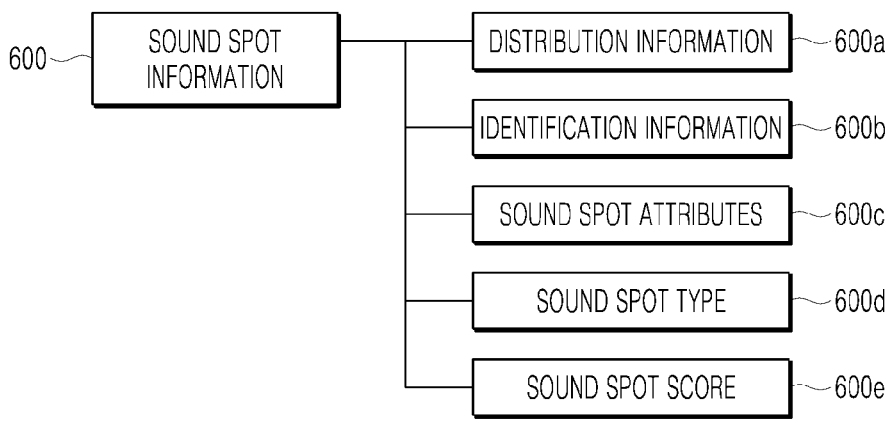
FIG. 4 is a diagram for illustrating sound spot information according to an embodiment of the present disclosure.

FIG. 4 is a diagram for illustrating sound spot information according to one embodiment.

The sound spot refers to a potential spatial location capable of emitting an input sound. Under control of the processor 170, the robot 100 stores, in the memory 160, sound spot information 600 about the sound spot.

The sound spot information 600 may include distribution information 600a, identification information 600b, sound spot attributes 600c, sound spot types 600d, and sound spot scores 600e of sound spots.

The distribution information 600a of sound spots refers to information about distributions of sound spots in each space. The distribution information 600a of sound spots may include location information of sound spots in a given space and the number of sound spots located in each space. For example, the distribution information 600a of sound spots for a living room may include information about the number and locations of sound spots located in the living room.

The identification information 600b of sound spots refers to information for identifying sound spots in an image. For example, the identification information 600b of sound spots may include images of sound spots. For example, the identification information 600b of sound spots may include information about features extracted from images of sound spots. For example, the identification information 600b of sound spots may include identifiers of sound spots.

The sound spot attributes 600c refer to information in accordance with attributes of the sound that may be emitted from a sound spot. In one example, the sound spot attributes 600c include user sound spots corresponding to places and objects where a user may be present, and context sound spots corresponding to places and objects where an event may occur.

A sound spot may correspond to either the user sound spot or the context sound spot, or may correspond to both the user sound spot and the context sound spot. For example, items such as a sofa, a chair, a table, and a bed may be classified as the user sound spot. For example, items such as a sink, a TV, a toilet, a stove, an alarm, a window, a doorbell, a glass cup, an electrical outlet, and the like may be classified as the context sound spot. For example, tables, sinks, toilets, etc. may correspond to the user sound spot and the context sound spot at the same time.

The sound spot type 600 is information indicating whether the corresponding sound spot is a candidate sound spot. The candidate sound spot refers to a place and an object determined as being likely to emit a sound.

In a case where the candidate sound spot is determined as a target sound spot for an input sound as a result of performing a sound source localization method on the corresponding input sound, the processor 170 may change the sound spot type 600*d* of the candidate sound spot determined as the target sound spot, from a candidate sound spot to a sound spot.

The sound spot score 600*e* is an indicator indicating the likelihood of a sound being emitted from a sound spot, and may serve as a reference in determining a search sequence for at least one sound spot.

For example, the sound spot score 600*e* may correspond to a frequency at which a sound is emitted from the sound spot. In other words, the sound spot score 600*e* may correspond to the number of times that the sound spot has been determined as a target sound spot as the result of performing a sound source localization method. For example, if the sound spot score 600*e* of a sofa is greater than the sound spot score 600*e* of a bed, it would mean that sounds have been emitted from the sofa more frequently than from the bed. In this case, to locate the sound source, the sound source localization method according to an embodiment may search the sofa first, which has a higher sound spot score 600*e*, prior to searching the bed.

For example, the sound spot score 600*e* may be determined as a sound emission probability value. In other words, the sound spot score 600*e* may be a probability value with respect to the sound emission possibility of a sound spot, which is determined based on accumulated results of localizing sound sources. In this case, the sound source localization method according to an embodiment may search the sound spot with a higher probability value with respect to sound emission possibility.

The memory 160 may store sound spot information 600 of a plurality of sound spots. The sound spot information 600 may include sound spot information 600 of at least one candidate sound spot. The sound spot type 600*d* of a candidate sound spot may be assigned as a value indicative of being a candidate sound spot. The sound spot score 600*e* of a candidate sound spot may be initially set to 0. That is, the candidate sound spot may be distinguishable from regular sound spots, which are not candidate sound spots, depending on the sound spot type 600*d* or the value stored in the sound spot score 600*e*.

Returning to FIG. 3, in step 510, the processor 170 may determine the search area in which to search for the sound source that has emitted the input sound, based on the sound spot information 600.

In step 510, the processor 170 may determine the search area in which to search for the sound source that has emitted the input sound, based on the sound spot information 600 stored in the memory 160.

Upon receiving the input sound, the robot 100 determines the area in which to carry out a search operation in order to locate the sound source that has emitted the input sound. The robot 100 may detect the input sound through the microphone 122 or may receive, through the transceiver 110, input sound data detected by an external device. The search area corresponds to an area in which the search operation is to be carried out. For example, the search area may be defined by a search radius range and a search direction range with respect to the current location of the robot 100. For example, the search area may be defined as spaces (for example, a bedroom and a kitchen) located in the surroundings with respect to the space in which the robot 100 is currently located (for example, a living room). The sound spot information 600 may include the distribution information 600*a* of sound spots, and in step 510, the processor 170 may determine the search area based on the distribution information 600*a* of sound spots. For example, the processor 170 may determine the space with the largest number of sound spots as a preferable search area. For example, the processor 170 may determine the search direction range most densely populated with sound spots as a preferable search area.

In step 510, the processor 170 may determine the search area based on the distribution information of sound spots having sound spot attributes that match the attributes of the input sound. In other words, the processor 170 may utilize the distribution information 600*a* of sound spots in consideration of the sound spot attributes, depending on the attributes of the input sound. For example, in a case where the input sound is a human voice, the processor 170 may determine the search area based on the distribution information 600*a* of sound spots whose sound spot attributes (600*c*) are user sound spots.

In step 530, the processor 170 searches for at least one sound spot located in the search area determined in step 510. In step 530, the processor 170 may search for the at least one sound spot located in the search area, according to the search sequence determined based on the sound spot information.

In step 530, the processor 170 determines the at least one sound spot located in the search area determined in step 510. To this end, the processor 170 may utilize the location information of sound spots included in the distribution information 600*a* of sound spots. That is, the processor 170 may determine at least one sound spot located in the search area, based on the location information of sound spots.

In step 530, the processor 170 searches for at least one sound spot located in the search area.

Searching for the sound spot may include setting the field of view of the robot 100 so as to face the sound spot, based on the location information of the sound spot, obtaining an image of the sound spot, and locating the sound source by analyzing the obtained image. Here, the field of view of the robot 100 may correspond to the camera 121 and/or an image sensor.

The processor 170 may orient the camera 121 and/or the image sensor toward the sound spot based on the location information of the sound spot, to obtain the image of the corresponding sound spot.

Instead of directly obtaining an image of an individual sound spot, the processor 170 may obtain an image of the search area by scanning the search area while orienting and moving the camera 121 and/or the image sensor toward the search area, and may extract an image area corresponding to each sound spot from the obtained image.

For example, in step 530, the processor 170 may obtain an image of the search area through the camera 121 and/or the image sensor, and based on the identification information 600*b* of sound spots, extract at least one image area corresponding to the each of at least one sound spot from the image of the search area.

That is, the processor 170 may extract an image area that corresponds to each sound spot from the image of the search area, based on image or attributes information stored in the identification information 600*b* of sound spots.

In step 550, which will be described below, the processor 170 may determine a target sound spot among the at least one image area extracted in step 530.

In step 530, the processor 170 may search the at least one sound spot sequentially according to a search sequence. For example, the processor 170 may determine the search sequence with respect to the at least one sound spot based on sound spot scores 600e. For example, among the at least one sound spot, the processor 170 may first search the sound spot having sound spot attributes 600c that match the attributes of the input sound. For example, the processor 170 may first search the closest sound spot based on the location information of sound spots.

Accordingly, effective and time-efficient sound source localization can be made possible in an environment where multiple sounds are emitted simultaneously.

In step 550, based on a result of searching in step 530, the processor 170 may determine, among the at least one sound spot searched in step 530, the target sound spot where the sound source is located.

In step 550, based on the identification information 600b of the at least one sound spot searched in step 530, the processor 170 may locate the sound source in the at least one image area extracted in step 530. For example, the processor 170 may locate the sound source by comparing image and/or attribute information contained in the identification information 600b of the sound spot to the image area extracted to correspond to the sound spot. For example, in a case where the sound of a window breaking is sensed as the input sound and the sound source is being localized, the broken window can be discovered by comparing the images stored in identification information of 'window' to an image extracted to correspond to 'window' in step 530, and the sound source can be thus located as 'window'. To this end, the processor 170 in step 550 may locate the sound source in the at least one image area extracted in step 530 by using the trained model based on an artificial neural network stored in the memory 160.

In step 550, the processor 170 may locate the sound source in the at least one image area extracted in step 530 based on attributes of the input sound. For example, in a case where the input sound is the user's voice, the processor 170 may locate the user by analyzing whether an image of the user is contained in the at least one image area.

In addition, the sound source localization method according to another embodiment may further comprise step 570 of determining an action in response to the input sound.

In step 570, the processor 170 may determine an action in response to the input sound based on the location of the sound source in the target sound spot determined in step 550. Here, the action in response to the input sound corresponds to the reaction of the robot 100 to the input sound.

In step 570, the processor 170 may determine the location of the sound source in the target sound spot determined in step 550.

For example, in a case where the input sound is the user's voice and the location of the user is determined as a target sound spot, the processor 170 may determine the user's location in the target sound spot by performing vision recognition through the camera 121 and/or the image sensor. Here, the location of the user may be the location of the user's face.

For example, in a case where the input sound is the sound of a window breaking and the window is determined as a target sound spot, the processor 170 may confirm the breakage of a glass window in the target sound spot by performing vision recognition through the camera 121 and/or the image sensor, and determine the location of the sound source. Here, the location of the sound source may be the location where the window is broken.

In step 570, the processor 170 may determine the action in response to the input sound based on the determined location of the sound source.

For example, in a case where the sound source is a user, the processor 170 may determine to take actions of tilting toward the user's face and adjusting the gaze of the robot 100 so as to face the user's face.

For example, in a case where the sound source is the window, the processor 170 may adjust the gaze of the robot 100 so as to face the window, capture an image of the broken window by using the camera 121 and/or the image sensor, and transmit the image to the terminal 200 and the server 300 through the transceiver 110. In this case, the processor 170 may cause the display 151 to flicker light, or may output an alarm message to the display 151 and output an alarm sound through the speaker 152.

Accordingly, by enabling precise reactions in response to the input sound, the satisfaction level regarding interactions can be improved.

In addition, the sound source localization method according to another embodiment may further comprise step 590 of updating the sound spot score of a target sound spot.

In step 590, the processor 170 may update the sound spot score of the target sound spot and store the updated sound spot score in the memory 160. For example, the processor 170 may increase the sound spot score of the target sound spot (for example, adding 1 to the sound spot score).

Figure 5:
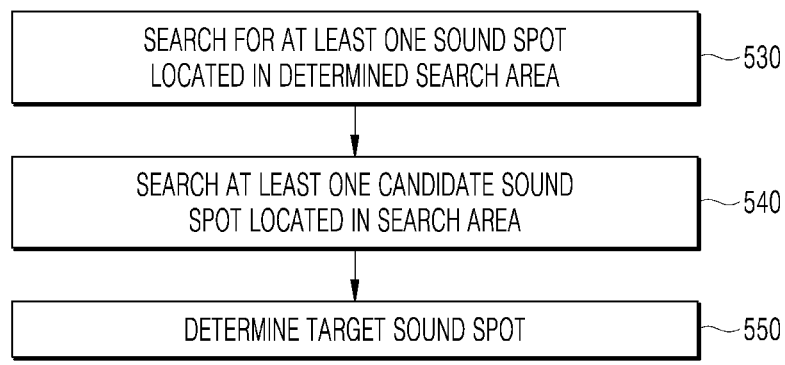
FIG. 5 is a flowchart for a sound source localization method according to an embodiment of the present disclosure.

FIG. 5 is a flowchart for a sound source localization method according to an embodiment of the present disclosure.

Referring to FIG. 3, in step 530, the processor 170 searches at least one sound spot located in the search area. In one example, in step 530, the processor 170 searches a sound spot of which the sound spot type 600d is regular sound spot rather than candidate sound spot. In one example, in step 530, among a plurality of pieces of sound spot information stored in the memory 160, the processor 170 searches a sound spot that has sound spot information with a sound spot score greater than 0.

In addition, in a case where the sound source could not be localized as a result of searching in step 530, candidate sound spots are searched in step 540.

In step 540, the processor 170 may search, among at least one candidate sound spot, the candidate sound spot located in the search area. The processor 170 searches the candidate sound spot located in the search area in the same manner as in step 530, previously described with reference to FIG. 3.

In step 550, the target sound spot where the sound source is located can be determined according to the search result in step 530 and step 540. In a case where the target sound spot is determined from among candidate sound spots, the processor 170 updates the sound spot score 600e of the determined candidate sound spot according to step 590 and changes the sound spot type 600d of the determined candidate sound spot to regular sound spot.

Figure 6:
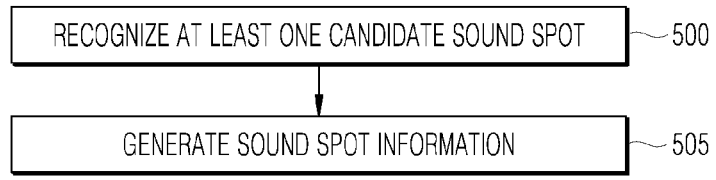
FIG. 6 is a flowchart for a process of generating sound spot information according to an embodiment of the present disclosure.

FIG. 6 is a flowchart for a process of generating sound spot information according to an embodiment of the present disclosure.

The robot 100 may store an object recognition model based on an artificial neural network in the memory 160. For example, the object recognition model may use a model implemented with a deep learning-based object detection technique, such as You only look once (YOLO), single shot detector (SSD), Tensorflow object detection, and a convolutional neural network (CNN). The robot 100 may generate sound spot information to use for sound source localization by using the object recognition model stored in the memory 160.

In step 500, the processor 170 may recognize at least one candidate sound spot by using the object recognition model stored in the memory 160.

In step 500, the processor 170 may obtain an image of a space in which the robot 100 is located through the camera 121 and/or the image sensor. The processor 170 may recognize the at least one candidate sound spot from the image of the space by using the object recognition model stored in the memory 160.

More specifically, in step 500, the processor 170 may recognize places and objects from the image of the space by using the object recognition model. The recognized places and objects may be each determined as a candidate sound spot.

In step 505, the processor 170 may generate sound spot information of the at least one candidate sound spot recognized in step 500. To this end, the processor 170 may generate sound spot information 600 of a candidate sound spot based on a reference database, and store the generated sound spot information 600 in the memory 160. Here, the reference database refers to a database which stores lists and attributes of various places and objects. The processor 170 may label sound spot attributes 600*c* of the candidate sound spot based on attributes of the recognized places and objects. The robot 100 may perform step 500 and step 505 periodically. For example, the robot 100 may perform step 500 and step 505 once daily.

Figure 7:
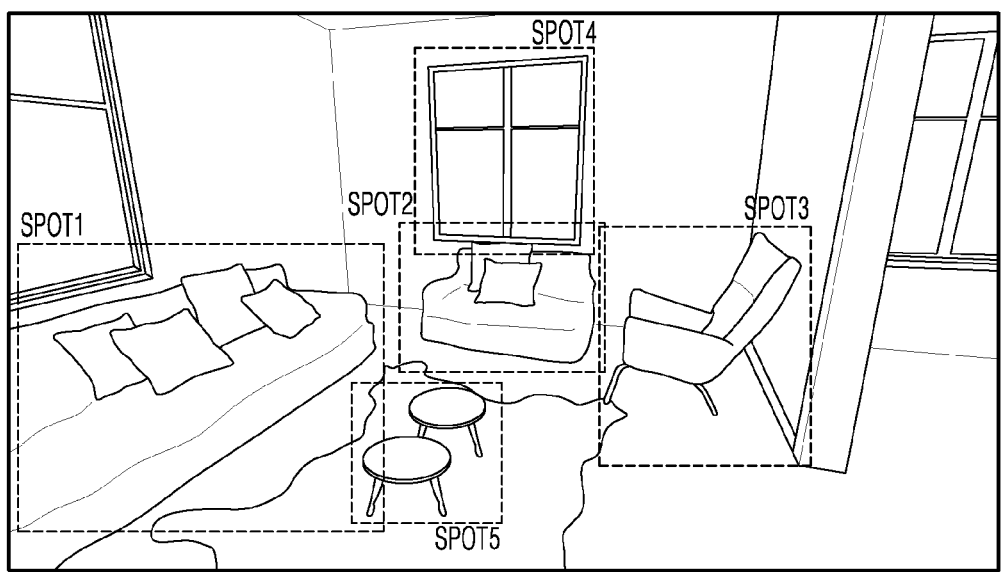
FIG. 7 is a diagram for illustrating a sound source localization method according to an embodiment of the present disclosure.

FIG. 7 is a diagram illustrating a sound source localization method according to an embodiment.

FIG. 7 shows an image of an example of a living room. For illustrative purposes, the living room shown as an example in FIG. 7 is assumed to have example sound spots including a three-seater sofa SPOT1, a single-seater sofa SPOT2, a chair SPOT3, a window SPOT4, and a table SPOT5. For illustrative purposes, it is assumed that the three-seater sofa SPOT1 has a sound spot score 600*e* of 4, the chair SPOT3 has a sound spot score 600*e* of 6, and the single-seater sofa SPOT2, the window SPOT4, and the table SPOT5, as candidate sound spots, each have a sound spot score 600*e* of 0.

Hereinbelow, an operation process of the sound source localization method according to an embodiment in the living room shown as an example in FIG. 7 will be described in detail with reference to FIG. 8.

Figure 8:
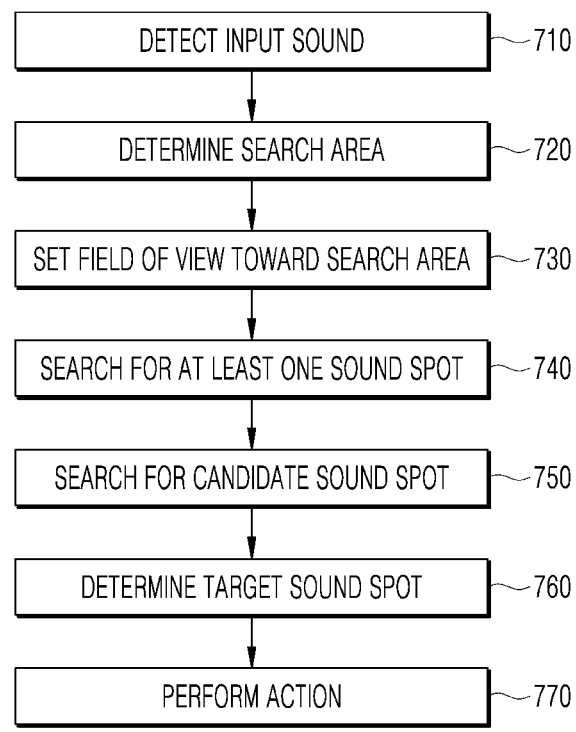
FIG. 8 is a flowchart for a sound source localization method according to an embodiment of the present disclosure.

FIG. 8 is a flowchart for a sound source localization method according to an embodiment of the present disclosure.

In step 710, the robot 100 detects an input sound.

In step 720, the robot 100 determines a search area in which to search for a sound source that has emitted the input sound, based on sound spot information stored in the memory 160 according to step 510 described above with reference to FIG. 3.

In step 730 and step 740, the robot 100 searches for at least one sound spot located in the search area according to step 530 described above with reference to FIG. 3.

In step 730, the robot 100 sets its field of view toward the search area and obtains an image of the search area and/or an image of an individual sound spot.

In step 740, the robot 100 performs searching in order to locate the sound source in the at least one sound spot located in the search area.

In step 750, the robot 100 searches for the at least one candidate sound spot located in the search area according to step 540 described above with reference to FIG. 5.

In step 760, the robot 100 determines a target sound spot where the sound source is located, based on the sound spot information according to the search results in step 740 and/or step 750.

In step 770, the robot 100 determines and performs an action in response to the input sound according to step 570 described above with reference to FIG. 3.

In addition, the robot 100 may update the sound spot score 600*e* of the target sound spot according to step 590 described above with reference to FIG. 3.

Hereinbelow, the flow of a sound source localization method according to an embodiment will be described with reference to the living room shown as an example in FIG. 7.

For example, in a case where a user utters 'Hey Chloe' while sitting in the single-seater sofa SPOT2, the robot 100 detects the utterance as an input sound in step 710.

For illustrative purposes, it is assumed that based on the distribution information 600*a* of sound spots, the living room is determined as a preferable area to be searched.

In step 730, the robot 100 sets its field of view toward the living room and obtains an image of the living room and/or an image of an individual sound spot.

In step 740, among at least one sound spot located in the living room, the robot 100 preferably searches the sound spot with a relatively higher sound spot score 600*e*. That is, the at least one sound spot located in the living room will be searched in descending order of sound spot scores 600*e*. That is, the robot 100 searches the chair SPOT3 first, and then searches the three-seater sofa SPOT1.

If the robot 100 was unable to locate the user in step 740, in step 750 the robot 100 searches the single-seater sofa SPOT2, the window SPOT4, and the table SPOT5, which are candidate sound spots located in the search area. The robot 100 locates the user in the single-seater sofa SPOT2.

In step 760, the robot 100 determines the single-seater sofa SPOT2 as a target sound spot, and in step 770, the robot 100 performs an action in response to the input sound. For example, the robot 100 may adjust its field of view so as to face the user's face, and answer 'Yes'.

In step 780, the robot 100 increases the sound spot score 600*e* of the single-seater sofa SPOT2 and changes the sound spot type 600*d* of the single-seater sofa SPOT2 to regular sound spot.

In another example, in a case where a burglar breaks in by breaking a glass window in the living room, in step 710, the robot 100 detects the sound of the glass window breaking as the input sound.

In step 720, it is assumed that the living room is determined as the area to be searched first, based on the distribution information 600*a* of sound spots.

In step 730, the robot sets its field of view toward the living room and obtains an image of the living room and/or an image of an individual sound spot.

In step 740, the robot 100 searches, among at least one sound spot located in the living room, the sound spot with a relatively higher sound spot score 600*e* first. That is, the at least one sound spot located in the living room will be searched in descending order of sound spot scores 600*e*. That is, the robot 100 searches the chair SPOT3 first, and then searches the three-seater sofa SPOT1.

If the robot 100 was unable to locate the event in step 740, in step 750 the robot 100 searches the single-seater sofa SPOT2, the window SPOT4, and the table SPOT5, which are candidate sound spots located in the search area. The robot 100 discovers the event of a broken window.

In step 760, the robot 100 determines the window SPOT4 as a target sound spot, and in step 770, the robot 100 performs an action in response to the input sound. For example, the robot 100 obtains an image of the broken window and transmits the obtained image to the terminal 200 and/or the server 300. In addition, the robot 100 may output an alarm message to the display 151 and/or the speaker 152.

In step 780, the robot 100 increases the sound spot score 600e of the window SPOT4, and changes the sound spot type 600d of the window SPOT4 to regular sound spot.

Figure 9:
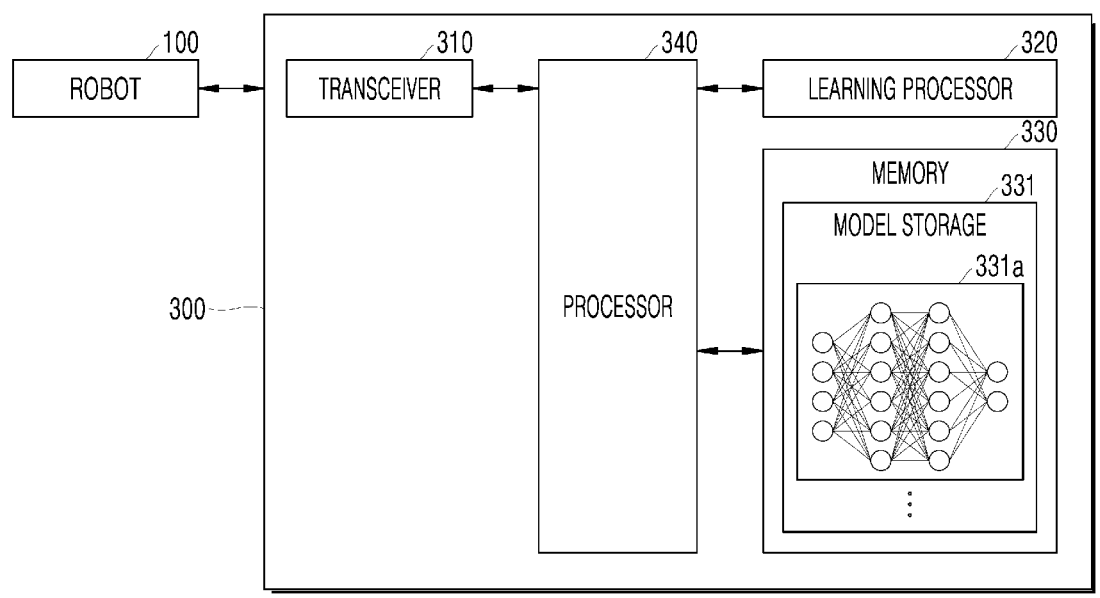
FIG. 9 is a block diagram of a server according to an embodiment of the present disclosure.

FIG. 9 is a block diagram of a server according to an embodiment of the present disclosure.

The server 300 may refer to a control server for controlling the robot 100. The server 300 may be a central control server for monitoring a plurality of robots 100. The server 300 may store and manage state information of the robot 100. For example, the state information may include information about the location of the robot 100, information about the action that the robot 100 is in the process of performing, and information about the remaining battery level of the robot 100.

The server 300 may store and manage the sound spot information. The server 300 may update the sound spot information and transmit the updated sound spot information to the robot 100.

The server 300 may receive an input sound that the robot 100 has detected, and based on the sound spot information stored on the server 300, discover the location of the sound source that has emitted the input sound, and transmit the location of the sound source to the robot 100.

Meanwhile, the server 300 may receive, from the robot 100, the result of carrying out an action on the input sound. For example, the server 300 may receive an event message and an alarm message from the robot 100. The server 300 may transmit the received event message and alarm message to the terminal 200.

The server 300 may refer to a device for training an artificial neural network using a machine learning algorithm or using a trained artificial neural network. Here, the server 300 may include a plurality of servers to perform distributed processing, or may be defined as a 5G network. The server 300 may also be included as a configuration of a portion of an AI device, such as the robot 100, to thereby perform at least some of the AI processing together with the AI device.

The server 300 may include a transceiver 310, a memory 330, a learning processor 320, and a processor 340.

The transceiver 310 may transmit and receive data to and from an external device, such as the robot 100.

The memory 330 may include a model storage 331. The model storage 331 may store a model (or an artificial neural network 331a) that is being trained or has been trained via the learning processor 320.

The learning processor 320 may train the artificial neural network 331a by using training data. The trained model may be used while mounted in the server 300 of the artificial neural network, or may be used while mounted in an external device such as the robot 100, or the like. For example, the trained model may be installed on the server 200 or installed on the robot 100 and utilized in determining the target sound spot. For example, the trained model may be installed on the server 200 or installed on the robot 100 and utilized in discovering the location of a sound source in the target sound spot.

The trained model may be implemented as hardware, software, or a combination of hardware and software. When a portion or the entirety of the trained model is implemented as software, one or more instructions, which constitute the trained model, may be stored in the memory 330.

The processor 340 may infer a result value with respect to new input data using the trained model, and generate a response or control command based on the inferred result value.

The example embodiments described above may be implemented through computer programs executable through various components on a computer, and such computer programs may be recorded on computer-readable media. In this case, examples of the computer-readable media may include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program instructions, such as ROM, RAM, and flash memory devices.

The computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numerical ranges include every individual value between the minimum and maximum values of the numerical ranges.

The order of individual steps in process claims according to the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations can be made depending on design conditions and factors within the scope of the appended claims or equivalents thereof.

It should be apparent to those skilled in the art that various substitutions, changes and modifications which are not exemplified herein but are still within the spirit and scope of the present disclosure may be made.

While the specific exemplary embodiments of the present disclosure have been described above and illustrated, it will be understood by those skilled in the art that the present disclosure is not limited to the described exemplary embodiments, and various modifications and alterations may be made without departing from the spirit and the scope of the present disclosure. Therefore, the scope of the present disclosure is not limited to the above-described exemplary embodiments, but shall be defined by the technical thought as recited in the following claims.

What is claimed is:

1. A robot, comprising:
a memory configured to store a sound spot information associated with at least one sound spot and to store an object recognition model based on an artificial neural network, wherein the sound spot information comprises distribution information, sound spot score, sound spot attribute and an image of the at least one sound spot; and
a processor configured to:
determine, based at least in part on the distribution information of the at least one sound spot, a search area to search for a sound source that has emitted an input sound, wherein the sound spot information corresponds to a potential spatial location capable of emitting the input sound;
search for the at least one sound spot located in the determined search area according to a search sequence, wherein the search sequence is determined based at least in part on the stored sound spot score of the at least one sound spot;
determine a target sound spot among the at least one sound spot based at least in part on a result of the searching, wherein the target sound spot corresponds to a location of the sound source; and
update the stored sound spot score of the determined target sound spot, wherein the processor is further configured to:
obtain an image of the determined search area;
extract at least one image area corresponding to each of the at least one sound spot from the obtained image based at least in part on the stored image of the at least one sound spot and
determine the target sound spot among the extracted at least one image area using the object recognition model based at least in part on the stored image of the at least one sound spot.

2. The robot of claim 1, wherein the search area is determined based at least in part on the distribution information having the sound spot attribute matching an attribute of the input sound.

3. The robot of claim 1, wherein the stored sound spot information further comprises a location information of the at least one sound spot, and
wherein the at least one sound spot is determined to be located in the determined search area based at least in part on the location information of the at least one sound spot.

4. The robot of claim 1,
wherein the at least one sound spot is determined to be located in the determined search area based at least in part on the sound spot attribute matching an attribute of the input sound.

5. The robot of claim 1, wherein the processor is further configured to localize the sound source in the extracted at least one image area based on an attribute of the input sound.

6. The robot of claim 1, wherein the processor is further configured to determine an action in response to obtaining the input sound based on the location of the sound source in the determined target sound spot.

7. The robot of claim 1, wherein the stored sound spot information is related to at least one candidate sound spot.

8. The robot of claim 7, wherein the processor is further configured to search for a candidate sound spot among the at least one candidate sound spot, wherein the candidate sound spot is located in the determined search area.

9. The robot of claim 7,
wherein the processor is further configured to:
obtain an image of a space;
recognize the at least one candidate sound spot from the obtained image of the space using the object recognition model; and
generate the stored sound spot information of the recognized at least one candidate sound spot.

10. A method for localizing a sound source, comprising:
storing, in a memory, sound spot information associated with at least one sound spot and an object recognition model based on an artificial neural network, wherein the sound spot information comprises distribution information, sound spot score, sound spot attribute and an image of the at least one sound spot;
determining, based at least in part on the distribution information of the at least one sound spot, a search area to search for the sound source that has emitted an input sound, wherein the sound spot information corresponds to a potential spatial location capable of emitting the input sound, wherein the sound spot information is associated with at least one sound spot;
searching for the at least one sound spot located in the determined search area according to a search sequence, wherein the search sequence is determined based at least in part on the stored sound spot score of the at least one sound spot, wherein the searching for the at least one sound spot comprises:
causing a camera to orient toward the determined search area,
scanning, by the camera, the determined search area to obtain an image of the determined search area, and
extracting at least one image area corresponding to each of the at least one sound spot from the obtained image of the determined search area based at least in part on the stored image of the at least one sound spot;
determining a target sound spot among the at least one sound spot based at least in part on a result of the searching, wherein the target sound spot is determined by determining the target sound spot among the extracted at least one image area using the object recognition model based at least in part on the stored image of the at least one sound spot, wherein the target sound spot corresponds to a location of the sound source; and
updating the sound spot score of the determined target sound spot.

11. The method of claim 10, wherein the search area is further determined based at least in part on the stored distribution information of the at least one sound spot having the sound spot attribute that matches an attribute of the input sound.

* * * * *